United States Patent [19]
Choi

[11] Patent Number: 5,016,091
[45] Date of Patent: May 14, 1991

[54] AUTOMATIC OPTICAL FILTER DISPLACING CIRCUIT

[75] Inventor: Hae-yong Choi, Kyunggi, Rep. of Korea

[73] Assignee: Samsung Electronics Co., Ltd., Rep. of Korea

[21] Appl. No.: 387,524

[22] Filed: Jul. 31, 1989

[30] Foreign Application Priority Data

Dec. 12, 1988 [KR] Rep. of Korea ............... 1988/20476

[51] Int. Cl.$^5$ ............................................. H04N 9/73
[52] U.S. Cl. ............................................. 358/29
[58] Field of Search ..................................... 358/29 C

[56] References Cited

U.S. PATENT DOCUMENTS

4,249,197  2/1981  van Spaandonk et al. ............ 358/29
4,355,325  10/1982  Nakamura et al. .................... 358/29

*Primary Examiner*—John W. Shepperd
*Attorney, Agent, or Firm*—Young-Pil Lee; Robert E. Bushnell

[57] ABSTRACT

An automatic optical filter displacing circuit for optimizing the white balance of video cameras is disclosed which comprises a buffer means; a sample and holder means for producing average values of the buffered luminance signals and for carrying out a sampling out of the average values; a first reference signal supply means; a first comparing means; a second reference signal supply means; a second comparing means; an optical filter control means; a trigger means for generating a white balance setting signal automatically; and a power supply means. The optical filters are automatically displaced so as to achieve the optimum state of the white balance by making judgements on the color temperature condition and the light amount condition of the illumination, and the electrical corrections are decided optimally depending on the illuminating conditions, thereby producing a good image quality.

22 Claims, 4 Drawing Sheets

FIG. 5

AUTOMATIC OPTICAL FILTER DISPLACING CIRCUIT

FIELD OF THE INVENTION

The present invention relates to an automatic optical filter displacing circuit, and particularly to an automatic optical filter displacing circuit which is capable of optimizing the white balance for different conditions such as color temperature, brightness and the like in accordance with the illumination of the place where a video camera is used.

BACKGROUND OF THE INVENTION

Generally, human eyes will sense white color as white color under any illuminating condition (for example, solar beam, fluorescent lamp, incandescent lamp). In the case of white color, the relative gains for red color (to be called hereinafter "R"), green color (to be called hereinafter "G"), and blue color (to be called hereinafter "B") are the same for each.

Figure 1:
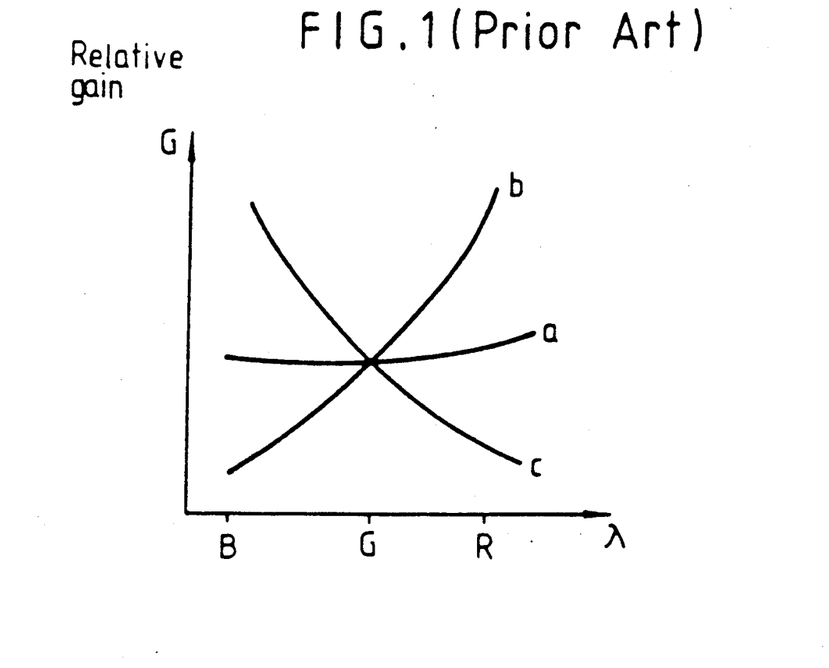
FIG. 1 is a graphical illustration of relative gains for different color wave lengths shown in the conventional image pickup devices.

However, MID (MOS image devices), CCD (charge coupled devices) and image sensing tubes such as vidicon or plumvicon show different relative gains for R,G,B when the color rays pass through the respective filters under different illuminating conditions. The relative gains for R,G,B have a nature as shown in FIG. 1. In comparison with the condition of standard illumination (curve "a"), if the color temperature is low, R will have a high gain and B will have a low gain as shown in curve "b", while, if the color temperature is high, B will have a high gain and r will have a low gain as shown in curve "C". Accordingly, a white color image signal from a video camera will be stained with blue color if the color temperature of the illumination source is high, while the white signal will be stained with red color if the color temperature of the illuminating source is low, such being the disadvantage of the conventional device.

In an attempt to give a solution to this problem, there has been proposed an apparatus which can regenerate proper color signals by correcting the variations of the color temperatures through electrically controlling the gains of the R and B signal amplifiers. The controlling of the amplifiers is carried out in such a manner that the color having a low gain is amplified by increasing the gain, while the color having a high gain is amplified by decreasing the gain, so that, in the case of white color, the relative gains for R,G,B should be made equal to one another under any illuminating condition, thereby adjusting the tone of color.

However, if the R and B signal gains are too much different from the gain of the reference color G, then the electrical correction, i.e., the amplifying rate, has to be carried out to a great extent. If the amplifying rate is made very large, noise is also amplified, and therefore, the overall image quality is aggravated.

Therefore, a different device has been proposed in which the transmittance characteristics are optically adjusted for different wave lengths by means of an optical color temperature displacing filter. However, in this device, the characteristics of the filter. i.e., the gains for R, G, B, are decided during the manufacturing of the filter, and therefore, the automatic linear white balance correction is impossible, unlike the case of the electrical correction, with the result that the displacing filter has to be used as an auxiliary means for the electrical correction.

For the reason set forth above, there is the disadvantage that the operator of the video camera has to experience difficulties in achieving a proper translation of the color temperature filter. If the white balance is to be achieved without carrying out the displacement of the color temperature filter properly, the electrical correction will be excessively required, with the result that a degradation of the image signals will appear.

Therefore, an improved technique for adjustment of the white balance is disclosed in Japanese patent publication No. Sho63-31293. In this technique, an iris, a fluorescent lamp correcting filter and a color temperature adjusting filter which are movable back and forth are provided in such a manner that the color temperature and the incident beam amount should be adjusted in accordance with the illuminating conditions for the illuminated object. However, this last device is very complicated due to the requirement for an optical filter driver and an iris driver, and therefore, there is the disadvantage that the manufacturing cost of the device becomes very high.

SUMMARY OF THE INVENTION

The present invention is intended to overcome the disadvantages of the conventional techniques described above.

Therefore, it is an object of the present invention to provide an automatic optical filter displacing circuit which is capable of optimizing the white balance adjustment for different color temperatures and different illumination conditions arising from the illumination of the involved field in using a video camera.

It is another object of the present invention to provide an automatic optical filter which is simple in its construction and low in its manufacturing cost.

In achieving the above objects, the circuit according to the present invention includes:

a buffer means for buffering the incoming R and B gain control signals and luminance signals;

a sample and holder stage for producing average values of the luminance signals from the buffering means, and for sampling the average values in response to an incoming automatic white balance set signal and a vertical driving signal;

a first reference signal supply for generating one or more color temperature translating reference signals based on the average value of the luminance signals sampled by the sample and holder stage;

a first comparator stage for making a judgement on the displacement at least one or more of color temperature translating filters after a comparison between the color temperature translating reference signals and the R and B gain control signals buffered by a buffer;

a second reference signal supply for generating at least one, or more, light amount adjustment reference signals;

a second comparator stage for making a judgement on the displacement at least one, or more, of light amount adjustment filters after carrying out a comparison between the light amount adjustment reference signal and the sampled average value of the luminance signals;

an optical filter control for controlling the positional displacement of the color temperature translating filter and the light amount adjustment filter based on the judgements made by the first and second comparator stage;

a trigger for generating a white balance set signal automatically after the displacement of the filter position by means of the optical filter control; and a power source supply for supplying electric power to the respective elements of the circuit for a predetermined period of time in response to the white balance set signal.

The color temperature translating filter and the light amount adjustment filter are disposed on a single rotary disc, and the rotary disc is driven by a driving element to control the positional displacements of the optical filters, thereby making the constitution of the circuit simpler. Further, proper optical filters are disposed on the light path depending on the illuminating conditions for the object illuminated, and therefore, the optimum white balance can be achieved.

BRIEF DESCRIPTION OF THE DRAWINGS

The above objects and other advantages of the present invention will become more apparent by describing in more detail the preferred embodiment of the present invention with reference to the attached drawings in which.

DESCRIPTION OF THE PREFERRED EMBODIMENTS

Figure 2:
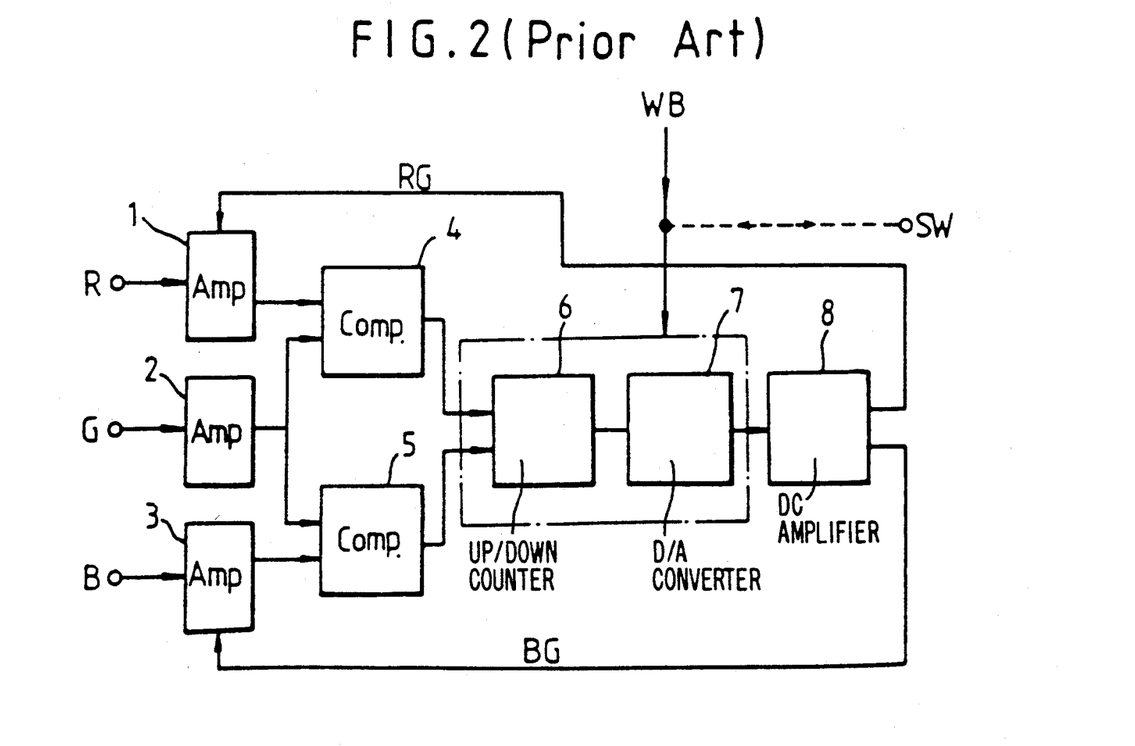
FIG. 2 illustrates the constitution of the conventional electrical white balance adjusting circuit.

Referring to FIG. 2, an electrical white balance adjusting circuit of the prior art is shown. In this drawing, R, G and B signals are respectively applied to R, G and B amplifiers 1,2,3 and the R and G signals amplified by the R and G amplifiers 1,2 are applied to a first comparator 4, while the G and B signals amplified by the G and B amplifiers 2, 3 are applied to a second comparator 5.

The outputs of the first and second comparators 4,5 are inputted into an up/down counter 6 which is enabled by means of an externally supplied automatic white balance set signal WB. The digital output of the up/down counter 6 will be converted into analogue signals by a D/A converter 7. A DC amplifier 8 amplifies the incoming analogue signals, and outputs R and B gain control signals RG, BG. The R and B gain control signals are supplied to the R and B amplifiers 1,3.

If the color temperature is low, the gain of the R signals will be larger than that of the G signals, and therefore, the up/down counter 6 will carry out up-countings in response to the output of the first comparator 4. The analogue signals corresponding to the counter value will be amplified, and be adapted to lower the amplification gain of the R amplifier 1, and to raise the amplification gain of the B amplifier 3, thereby making the ratio between the relative gains of the R, G and B signals 1:1:1.

in the case where the color temperature is high, a control procedure is carried out in a manner inverse to that described above.

Figure 3:
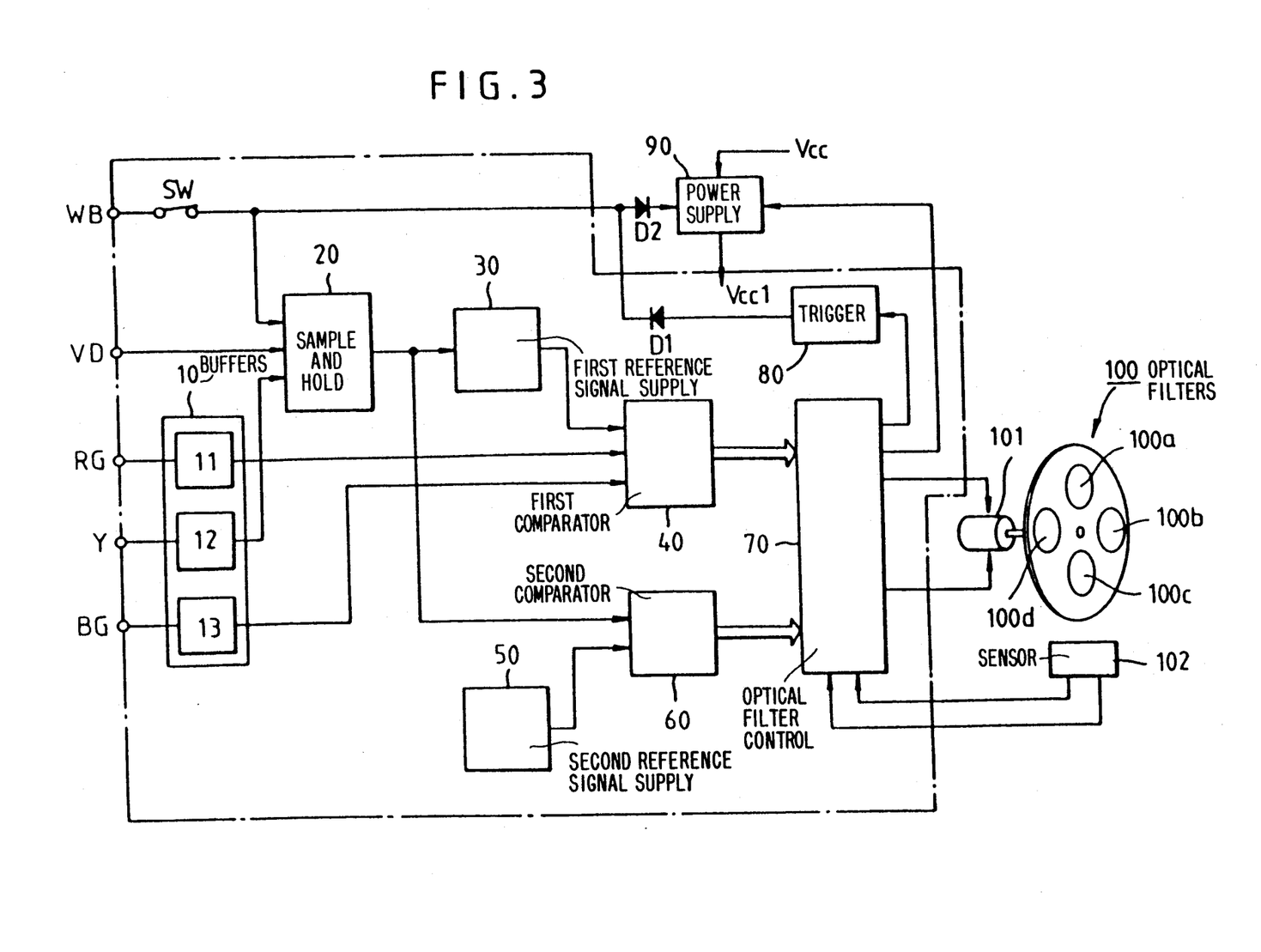
FIG. 3 is a block diagram of an embodiment of the present invention.

FIG. 3 is a block diagram of the circuit of the present invention, which shows:

a buffer 10 for buffering the R and B gain control signals RG, BG and a luminance signal Y;

a sample and hold stages 20 for producing average values of the luminance signals Y buffered by the buffer means 10, and for holding a sample after performing a sampling out of the average values of the luminance signal Y in response to an incoming white balance set signal WB and a vertical driving signal VD;

a first reference signal supply 30 for generating at least one, or more, color temperature translating reference signals in accordance with the sampled average value of the luminance signal Y from the sample and hold stage 20;

a first comparator stage 40 for making judgements on the displacements of at least one or more of color temperature translating filters after making a comparison between the color temperature translating reference signal generated by the first reference signal supplying means 30 and the R and B gain control signals, RG, BG buffered by the buffering means 10;

a second reference signal supply 50 for generating one or more light amount adjusting reference signals;

a second comparator stage 60 for making judgements on the displacements of one or more light amount adjusting filters after making a comparison between the average value of the luminance signals Y sampled by the sample and hold stage 20 and the light amount adjusting reference signal supplied from the second reference signal supplying means 50;

an optical filter control means 70 for generating control signal to displace the positions of the color temperature translating filter and the light amount adjusting filter in accordance with the judgement signals outputted from the first and second comparing means 30, 50;

a trigger means 80 for automatically generating a white balance set signal WB after the displacements of the optical filters by the optical filter control means 70; and a power supply means 90 for supplying power source voltages to the said respective means for only a predetermined period of time in response to the inputting of the white balance set signal WB.

The color temperature translating filter and the light amount adjusting filter are disposed on the single rotary disc 100, the rotary disc 100 is mounted to rotate by means or a motor 101, and the motor 101 is desirably driven by means of the optical filter control means 70.

According to the embodiment of the present invention, four optical filters 100a to 100d are disposed on the single rotary disc 100, and the characteristics of these filters are as shown in Table 1 below.

TABLE 1

| optical filter | color temperature characteristics | Light amount adjusting characteristics |
|---|---|---|
| 100a | 3200° K | |
| 100b | 5600° K | |
| 100c | 5600° K | ¼ ND |
| 100d | 5600° K | 1/16 ND |

In the above table, the symbol ND (neutral density) is a unit for expressing a relative transmittance of a certain filter against the transmittance of a filter which has no wave length preference for visible light.

The rotary disc 100 is fixed on a shaft of the motor 101 which is driven by the optical filter control means 70.

Further, a filter position detecting means 102 is provided for detecting the positions of the four optical filters 100a to 100d disposed on the rotary disc 100, and the filter position detecting means 102 is desirably constituted such that it should supply 2-bit position detecting signals to the optical filter control means 70.

The white balance set signal WB generated by the trigger means 80 after displacement of optical filters is supplied through reverse flow preventing diodes D1 and D2 to the power supply means 90, and is also supplied through the diode D1 and a switch SW to an electrical white balance adjusting circuit as shown in FIG. 2.

Figure 4:
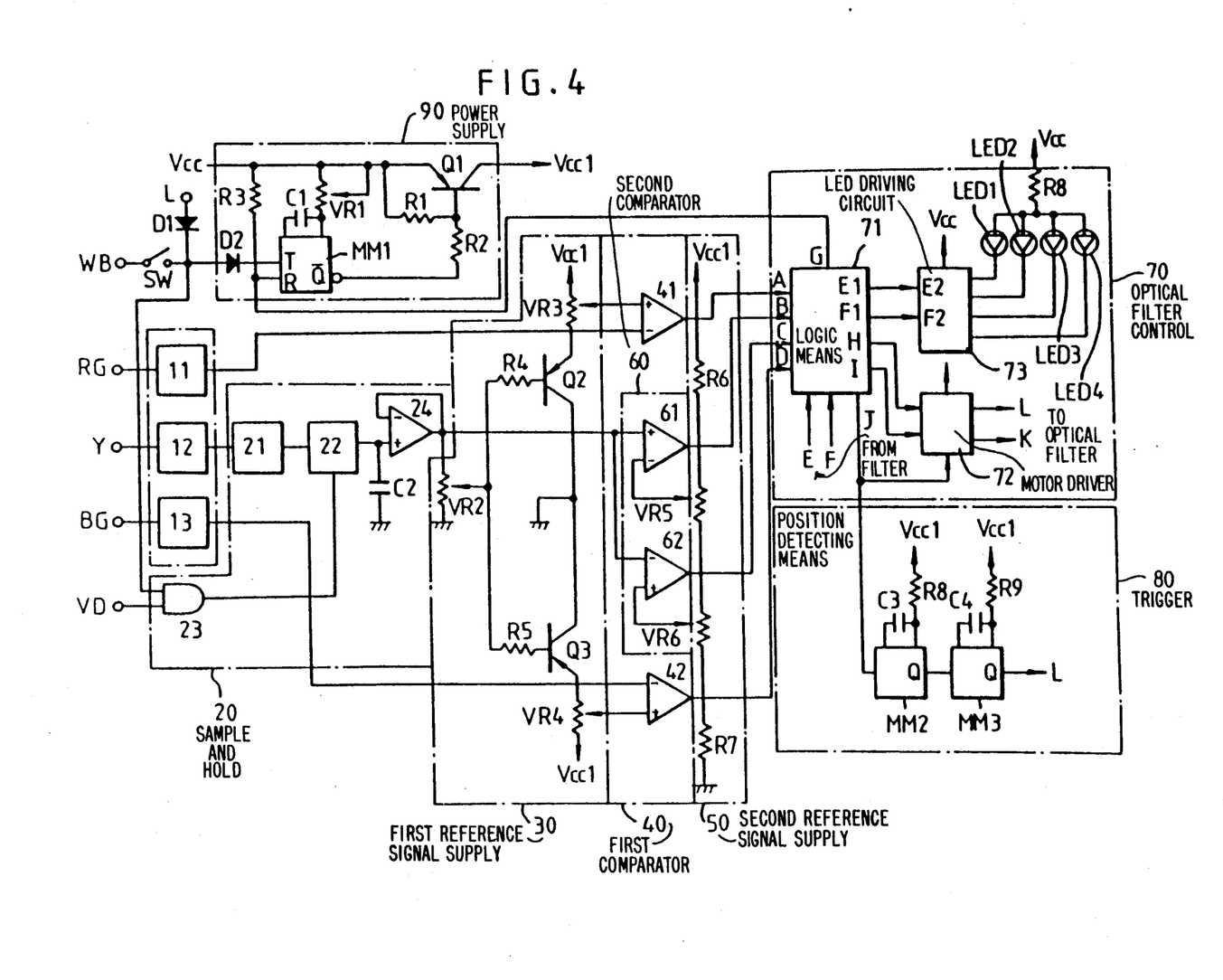
FIG. 4 is a schematic circuit illustration of the embodiment of FIG. 3.

FIG. 4 shows an embodied circuit for the block diagram of FIG. 3. In the drawing, the R and B gain control signals RG, BG are for controlling the R and B signal gains, and are buffered by a first and third buffer 11,13, so that they should not give any kind of influence to the conventional camera circuit. The luminance signal Y is first buffered by a second buffer 12, and is supplied to an integrator 21 of the sample and holder means 20. The integrator 21 generates an average signal of the inputted luminance signals Y, and the average signal is outputted to a switching means 22.

Here, if an automatic white balancing switch SW is closed, the white balance set signal WB is inputted from an external supplier into a first input terminal of a sampling pulse generating AND gate 23, while a vertical driving pulse VD is inputted into a second input terminal of the AND gate 23, so that the two signals should be logically AND'ed. Also, if the white balancing switch SW is closed, a high level signal as for a trigger signal is supplied to a trigger terminal T of a monostable multivibrator MM1 which constitutes the timer of the power supply means 90.

Then, an inverted output terminal $\overline{Q}$ of the monostable multivibrator MM1 output a low level signal. Therefore, a power supplying transistor Q1 will be turned on through resistances R1, R2 so that the power voltage Vcc should be supplied to the respective means for a predetermined period of time based on time constants determined by a resistance VR1 and a capacitance C1. If the predetermined time is lapsed, the transistor Q1 is turned off so that the power supply Vcc1 to the respective means should be disconnected.

The power source Vcc is connected through a resistance R3 to a reset terminal R of the monostable multivibrator MM1, so that the multivibrator MM1 should be normally actuatable.

The AND gate 23 is for making the sampling pulses correspond to the vertical period. If the output signal of the AND gate 23 is positive, a sampling operation is carried out by the switching means 20.

The sampling signals outputted from the switching means 22 are supplied to a signal holding capacitor C2 where the signals are accumulated. The accumulated signals will be held until the next sampling operation, and this held voltage will be inputted into the input terminal of a voltage follower type amplifier 24. The output voltage of the amplifier 24 will be applied to an inverting input terminal of the amplifier 24, and at the same time, the output voltage is also supplied to a variable resistance VR2 of the first reference signal generating means 30, and to an input terminal and inverting input terminal of third and fourth comparators 61, 62 of the second comparing means 60.

The variable resistance VR2 sets the voltage of the amplifier 24 to a proper level which, in turn, enables the generation of a first and second reference signals applied to the first and the second comparator 41, 42 within the first comparing means 40.

Further, the output voltage of the amplifier 24 is supplied through variable resistance VR2 to an active resistance means, i.e., to bias resistances R4, R5 of transistors Q2, Q3. The variable resistance VR2 makes the current flowing through the bases of the transistors Q2, Q3 variable, so that the voltage variations occurring between the emitters and collectors of the transistors Q2, Q3 should be controlled by means of the variations of the output of the amplifier 24. This is, after the sampling of an average value of the luminance signal Y along the vertical period, the reference voltages of the first and second comparators 41, 42 are varied through the utilization of an output signal which is determined proportionately to the variations of the sampled signal level. Because the degradation of the video signals are reduced even if the electrical correction of the white balance under the condition of an excessively large amount of light is increased, the filter displacing ranges are reduced as far as possible due to the variability of the reference voltage.

On the other hand, in the case where the incident light amount is small, the white balance correction is dependent on the optical filters, and the range of the electrical adjusting is reduced, thereby preventing the degradation of the ratio of the signals to the noise.

Figure 5:
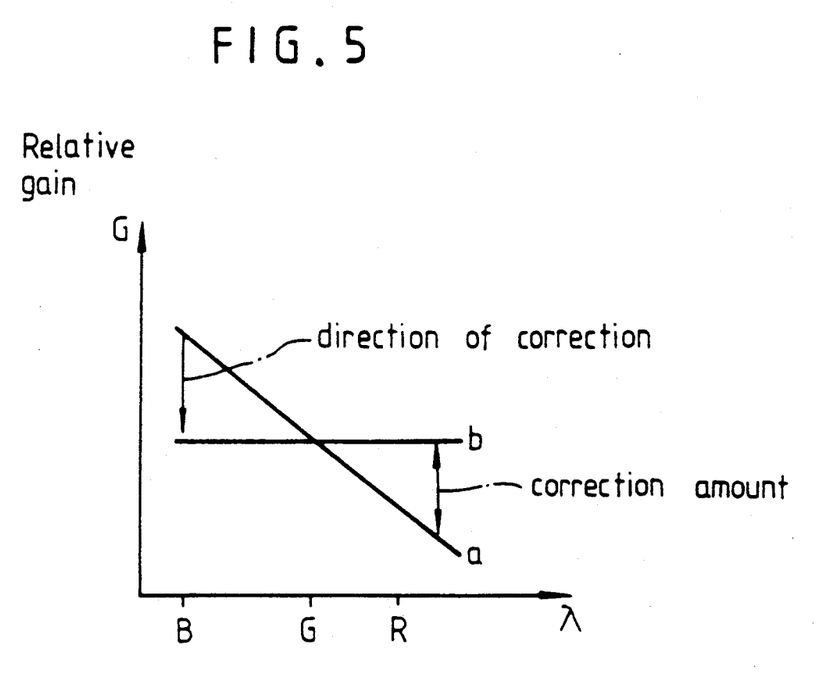
FIG. 5 is a graphical illustration showing a white balance correction in the case in which a white-colored object is sensed by a new image pickup device adopting the circuit of the present invention.

Referring to FIG. 5, a white balance correction procedure is illustrated in the case a white-colored object is sensed under an illumination condition of high color temperature by a new image pickup device adopting the circuit according to the present invention. The line "a" shows relative gains before the white balance correction, while the line "b" shows relative gains after the same correction.

If the average value of the Y signals is high, a high voltage will be supplied through the amplifier 24 to the bases of the transistors Q2, Q3. Accordingly, the potentials of the emitters of the transistors Q2, Q3 will be elevated, thereby elevating the voltage applied to the input terminals of the first and second comparators 41, 42 through passive resistance means, i.e., the variable resistances VR3, VR4 for defining the reference level.

If the output signals of the first and second comparators 41, 42 are to drop from a high state to a low state, the values of the output signals of the first and third buffers 11, 13 have to be large. When the output signals of the first and second comparators 41, 42 are at a low state, the color temperature translating filter is displaced.

First and second light amount adjusting reference voltages of different levels are set respectively to third and fourth comparators 61, 62 of the second comparing means 60, by means of reference voltage set variable resistances VR5, VR6. An average voltage of the Y signals is supplied respectively to the input terminal of the third comparator 61 and to the inverting input terminal of the fourth comparator 62. Then the voltage values are respectively compared with the first and second light amount adjusting reference voltages, and the resultant signals will be outputted to the input terminals B, C of a logic means 71 within the optical filter control means 70.

The signals inputted into the input terminals B, C are compared with the incident light amounts, and the resultant data are used as the signals for driving the light amount adjusting filter or the neutral density filter. The driving of the filters based on the signals inputted into the input terminals B, C can be represented as in Table 2 below.

TABLE 2

| BC | State | Motion of filter | G |
|---|---|---|---|
| LH | ND decrease | Left turn | H |
| RR | No change | Stop | L |
| HL | ND increase | Right turn | H |

The first comparator 41 will compare the R gain control signal voltage with the first color temperature translating reference voltage, and will output the compared resultant signal to an input terminal A of the logic means 71. The second comparator 42 will compare the B gain control signal voltage with the second color temperature translating reference voltage, and will output the compared resultant signal to an input terminal D of the logic means 71. The signals inputted into the input terminals A, D will serve as the signals for driving the color temperature translating filter, and can be specified as in Table 3 below.

TABLE 3

| AD | State | Filter motion | G |
|---|---|---|---|
| LL | — | Stop | |
| LH | Color temperature lowered | Left turn | H |
| HL | Color temperature lowered | Right turn | H |
| RH | No change | Stop | L |

The input signals A to D re logic-combined in the logic means 71 with the 2-bit filter position detecting signals E, F which indicate the positions of the optical filters constituted as shown in FIG. 2. The relationship between the filter positions and the filter position detection signals E, F can be summarized as in Table 4 below.

TABLE 4

| EF | Filter position | Filter characteristics |
|---|---|---|
| LL | 100a | 3200° K |
| LH | 100b | 5600° K |
| HL | 100c | 5600° K + ½ ND |
| HH | 100d | 5600° K + 1/16 ND |

The logic means 71 can consist of a gate device, a programmable logic array device, or a hardware installment while it can be realized by a software program of a microprocessor. The operative state of the logic means 71 can be summarized as in Table 5 below.

TABLE 5

| NO. | Filter position | State | Filter motion | HIG |
|---|---|---|---|---|
| 1. | 100a→100a | No change | No motion | HHL |
| 2. | 100a→100b | Color tem. translated | Right turn | HLH |
| 3. | 100b→100a | Color tem. translated | Left turn | LHH |
| 4. | 100b→100b | No change | No motion | HHL |
| 5. | 100b→100c | ND changed | Right turn | HLH |
| 6. | 100c→100b | ND changed | Left turn | LHH |
| 7. | 100c→100c | No change | No motion | HHL |
| 8. | 100c→100d | No changed | Right turn | HLH |
| 9. | 100d→100c | No changed | Left turn | LHH |
| 10. | 100d→100d | No change | No motion | HHL |

TABLE 5-continued

| NO. | Filter position | State | Filter motion | HIG |
|---|---|---|---|---|
| 11. | 100d→100a | Color tem. translated & ND changed | Right turn | HLH |

The number of the logic states based on the input conditions for the logic means 71 is $2^6=64$, but the number of the available input conditions which are practically occurrable is 11, the operation proceedings being satisfied by this number. The signals outputted from the output terminals H, I of the logic means 71 are 2-bit control signals, and are adapted to control a motor driver 72 for driving the optical filters in three operation control mode i.e., left turn, right turn and no motion.

Further, filter position detection signals E, F are simply outputted through an internal buffer means (not shown) to output terminals E1. F1 of the logic means 71 so that signals E1, F1 of output terminals will have the same condition as that of the filter position detection signals E,F. The signals outputted form the output terminals E1, F1 of the logic means 71 are inputted as for filter position indicating signals into input terminals E2, F2 of an LED driving circuit 73. Cathode terminals of four light emitting diodes LED1-LED4 are connected to the output terminals of the LED driving circuit 73, and to the respective anode terminals of them, the power source +Vcc is supplied through a resistance R8. In accordance with the signals supplied to the LED driving circuit 73, light emitting diodes LED1-LED4 will be lighted to perform a display. Light emitting diodes LED1-LED4 are operated governed by the relationship specified in Table 6.

TABLE 6

| E1 | F1 | LED1 | LED2 | LED3 | LED4 |
|---|---|---|---|---|---|
| L | L | L | H | H | H |
| L | H | H | L | H | H |
| H | L | H | H | L | H |
| H | H | H | H | H | L |

The signals outputted through an output terminal G of the logic means 71 will have a high or low state depending on the existence of absence of the displacements of the filters. In case that the filter displacement is needless, a low state signal from the output terminal G of the logic means 71 is applied to a reset terminal R of the monostable multivibrator MM1, and thereby, the transistor Q1 is turned off to disconnect the appliance of power voltage Vcc1 from the respective circuitry units.

Further, when displacements of the filters are being carried out, the output signals of high level from an output terminal J of the logic means 71 will be applied to the trigger means 80 to generate a new white balance set signal, which enables the operation of white balance to be reinitiated after completion of the filter displacements of the prior stage. In more detail, the monostable multivibrator MM2 will generate a positive pulse with a pulse width based on time constant of the capacitor C3 and the resistance R8 when the output signal of the output terminal J of the logic means 71 is shifted from a high state to a low state. Thereafter, if the output terminal Q of the multivibrator MM2 comes to have a low state, then the monostable multivibrator MM3 will be triggered to generate a positive pulse having a pulse width based on the time constants of the capacitance C4 and the resistance R9, and the positive pulse will constitute an automatic white balance set output signal "L".

Furthermore, the output signal of the output terminal J will act as an output enabling signal of the motor driver 72. That is, when the output signal of the output terminal J becomes high state, the motor driver 72 can produce the motor driving signals K,L in response to the output signals H, I from the logic means 71.

As described above, the circuit according to the present invention has the advantages that the constitution of the circuit is very simple, the optical filters are automatically displaced so as to achieve the optimum state of the white balance by making judgements on the color temperature condition and the light amount condition of the illumination, and the electrical correction is decided optimally depending on the illuminating conditions, thereby making the device adopting the circuit of the present invention convenient and producing a good image quality.

What is claimed is:

1. An automatic optical filter displacing circuit, comprising:
    means for buffering incoming R and B gain control signals and luminance signals;
    means for sampling and holding said luminance signals supplied by said buffering means, to produce average values of said luminance signals and carry out a sampling of said average values in response to an incoming automatic white balance set signal and a vertical driving signal;
    first means for generating a first reference signal by generating color temperature translating reference signals based on said average values of luminance signals sampled by said sampling and holding means;
    first means for making a judgment about the displacement of an optical filter after making a comparison between said color temperature translating reference signal and said buffered R and B gain control signals;
    second means for generating light amount adjusting reference signals;
    second means for making a judgment on the displacement of the optical filter after comparing said light amount adjusting reference signal with said sampled average value of luminance signals;
    means for controlling positional displacement of the optical filters based on judgments of said first and second means for making a judgment;
    trigger means for generating said white balance set signal, said trigger means being automatically activated after positional displacement of the optical filter; and
    means for supplying power to said first and second generating means, trigger means and positional displacement means for a predetermined period of time in response to said white balance set signal supplied by said trigger means.

2. The circuit as claimed in claim 1, wherein said first generating means comprises:
    means for creating a first resistance; and
    means for creating a second resistance, connected in series with said means for creating a first resistance between a reference potential and a power supply, with said means for creating the second resistance being a variable resistance supplied with an output voltage from said average value of incoming luminance signals, whereby voltage signals divided from a supplied voltage based on the resistance value of said means for creating a second resistance corresponding with the incoming light amount are applied as the color temperature translating reference signals to said first comparing means.

3. The circuit as claimed in claim 1, wherein said means for controlling positional displacement of optical filters comprises:
    logic means for receiving output signals of said first to fourth comparators and the filter position detection signal for the currently selected optical filter, for generating control signals for the positional displacement of the optical filters in accordance with said received signals, for generating filter position indicating signals correspondingly with said filter position detecting signals, for generating trigger control signals for achieving again the white balance immediately after the displacement of the filter and with the white balance immediately after the displacement of the filter said trigger control signals being synchronous with the generation of said filter position displacement control signal, and for generating a reset signal to reset the power supply means when the displacement of the filters is not needed or the white balance is again achieved after completion of the filter displacements;
    means for indicating the positions of the filters after receipt of said filter position indicating signal generated by said logic means; and
    means for driving optical filters upon receipt of said filter position displacement controlling signals generated by said logic means.

4. An automatic optical filter displacing circuit, comprising:
    means for buffering incoming R, B and luminance signals;
    means for sampling and holding said luminance signals to produce an average value of said luminance signals;
    means for generating color temperature translating reference signals based on said average value of luminance signals;
    first means for comparing said color temperature translating reference signals with said buffered R and B signals;
    means for generating light amount adjusting reference signals;
    second means for comparing said light amount adjusting reference signals with said average value of luminance signals;
    means for controlling positional displacement of optical filters based on signals from said first and second means for comparing;
    trigger means for generating a white balance set signal based on displacement of the optical filters by said means for controlling optical filters; and
    power supply means for driving said circuit based on said white balance set signal.

5. The circuit as claimed in claim 4, wherein said first means for comparing comprises:
    a first comparator making judgments on displacement of the optical filters toward a high color temperature translation by comparing said buffered R gain control signal and one of said color temperature translating reference signals; and a second comparator making judgments on the displacement of the filters toward a low color temperature translation by comparing said buffered B gain control signal and another of said color temperature translating reference signals.

6. The circuit as claimed in claim 5, wherein said means for generating a light amount adjusting reference signal supplies first and second amount adjusting reference signals having different voltage levels.

7. The circuit as claimed in claim 6, wherein said second means for comparing comprises;
   a third comparator for making judgments on the displacement of the optical filters toward a first light amount adjustment by comparing said average value of luminance signals with said first light amount adjusting reference signal; and
   a fourth comparator for making judgments on the displacements of the optical filters toward a second light amount adjustment by comparing said average value of luminance signals with said second amount adjusting reference signal.

8. The circuit as claimed in claim 7, wherein said means for controlling positional displacement of the optical filters comprises:
   logic means for receiving output signals of said first, second, third and fourth comparators and a detection signal indicative of position of the optical filters for a currently selected optical filter, for generating control signals for controlling the positional displacement of the optical filters in accordance with said output signals and detection signal, for generating filter position indicating signals correspondingly with said detection signal, for generating trigger control signals for achieving again the white balance immediately after the displacement of the optical filters, said trigger control signals being synchronous with the white balance immediately after the displacement of the optical filters and with the generation of said control signals and for generating a reset signal to reset the power supply means when the displacement of the optical filters is not needed or the white balance is again achieved after completion of displacement of the optical filters;
   means for indicating the positions of the optical filters after receipt of a filter position indicating signal generated by said logic means; and
   means for driving optical filters upon receipt of a control signals generated by said logic means.

9. The circuit as claimed in claim 8, wherein said optical filters comprise color temperature translating and light amount adjusting filters located on a single rotary disc fixed to the shaft of an optical filter driving motor driven by said means for driving optical filters.

10. The circuit as claimed in claim 8, wherein said optical filters comprise:
    one low color temperature translating filter; and
    three high color temperature translating filters all having the same color temperature characteristics and different light amount adjusting characteristics.

11. The circuit as claimed in claim 7, wherein said optical filters are provided with a filter position detecting means for detecting the position of the relevant filter.

12. A method for optimizing white balance of video cameras, comprising the steps of:
    buffering incoming R and B gain control signals and luminance signals;
    sampling and holding said luminance signals to produce average values;
    generating a first reference signal based on the average values received from sampling and holding said luminance signals;
    making a first comparison between said first reference signal and said buffered R and B gain control signals;
    generating a second reference signal;
    making a second comparison between said second reference signal and the sampled average value of said luminance signals; and
    controlling a color temperature translating filter and light amount adjusting filter based on said first and second comparisons.

13. A method as claimed in claim 12, wherein buffering each of said three signals, R, B and luminance, is done in separate buffers.

14. A method as claimed in claim 13, wherein said steps of making a comparison of said R and B signals to said first reference signal is performed in first and second comparators, by said first comparator for said R signal and by said second comparator for said B signal.

15. A method as claimed in claim 14, wherein comparing of said luminance signal to said second reference signal is performed in third and fourth comparators, said luminance signal is applied to the positive input terminal of said third comparator and to the negative input terminal of said fourth comparator.

16. An automatic optical filter displacing circuit, comprising:
    buffer means for buffering an incoming red gain control (RG) signal, blue gain control (BG) signal and luminance (Y) signal from a color video signal source;
    sample and hold means for sampling and holding said incoming luminance signal for generating average values of said luminance signal;
    reference signal generating means for generating respective first and second reference signals with said first reference signal being based on the average values of said luminance signal;
    comparator means for comparing said first and second reference signals with said incoming red gain control, blue gain control, and said average value of the luminance and providing results of said respective comparisons;
    optical filter control means for controlling positional displacement of optical filters for light amount adjustment and color temperature translation based on said results of said comparisons provided by said comparator means
    trigger means for generating a white balance set signal after displacement of said optical filters by said optical filter control means and
    power supply means for supplying power to said circuit.

17. The circuit as claimed in claim 16, wherein said buffer means comprises three separate buffers for buffering said red gain control, blue gain control and luminance signals, respectively, each in a separate buffer.

18. The circuit as claimed in claim 16, wherein said reference signal generating means comprises:
    first reference signal generating means for generating one or more color temperature translating reference signals based on values from said sample and hold means; and second reference signal generating means for generating one or more light amount adjustming reference signals.

19. The circuit as claimed in claim in claim 18, wherein said comparator means comprises:

first comparator means for comparing said color temperature translating reference signals with said R and B gain control signals and making a first judgment about said comparison and for signalling said optical filter control means for controlling said optical filters on the basis of said first judgment; and second comparator means for comparing said light amount adjusting reference signals with said sampled average value of said luminance signal and making a second judgment about said comparison and for signalling said optical filter control means for controlling said optical filters on the basis of said second judgment.

20. The circuit as claimed in claim 19, wherein said power supply means supplies electric power for a predetermined time based on said white balance set signal generated by said trigger means.

21. An automatic optical filter displacing circuit, comprising:

means for receiving R, B and luminance signals;

means for controlling an optical filter disc based on said received signals; and trigger means, activated by a signal from said controlling means, for generating a white balance set signal to trigger a power supply for driving said circuit for a predetermined time period.

22. A circuit as claimed in claim 21, wherein said optical filter disc comprises a plurality of color temperature translating and light amount adjusting filters.

* * * * *